US007032808B2

(12) United States Patent
Shabtay

(10) Patent No.: US 7,032,808 B2
(45) Date of Patent: *Apr. 25, 2006

(54) THERMAL SPRAY APPLICATION OF BRAZING MATERIAL FOR MANUFACTURE OF HEAT TRANSFER DEVICES

(75) Inventor: Yoram Leon Shabtay, Prospect Heights, IL (US)

(73) Assignee: Outokumu Oyj, Espoo (FI)

( * ) Notice: Subject to any disclaimer, the term of this patent is extended or adjusted under 35 U.S.C. 154(b) by 22 days.

This patent is subject to a terminal disclaimer.

(21) Appl. No.: 10/678,169

(22) Filed: Oct. 6, 2003

(65) Prior Publication Data

US 2005/0072836 A1 Apr. 7, 2005

(51) Int. Cl.
*B23K 31/02* (2006.01)
*B23K 35/24* (2006.01)
*F28F 1/00* (2006.01)

(52) U.S. Cl. ............. 228/183; 228/262.1; 228/262.61; 165/177

(58) Field of Classification Search ........ 482/146–148; D21/412, 688; 228/183, 157, 262.1, 262.61; 29/890.03; 165/143, 173, 177
See application file for complete search history.

(56) References Cited

U.S. PATENT DOCUMENTS 4,633,056 A 12/1986 Schlosser
4,681,772 A 7/1987 Rairden, III
5,026,599 A 6/1991 Koskenmaki
5,130,090 A 7/1992 Rissanen
5,178,827 A 1/1993 Rissanen
5,186,251 A 2/1993 Joshi
5,217,746 A 6/1993 Lenling et al.
5,378,294 A 1/1995 Rissanen
5,429,794 A 7/1995 Kamf et al.
5,441,106 A 8/1995 Yukitake
5,479,985 A * 1/1996 Yamamoto et al. ......... 165/126
5,482,744 A 1/1996 Pearson
5,579,837 A 12/1996 Yu et al.
5,704,423 A * 1/1998 Letrange ..................... 165/177
5,733,662 A 3/1998 Bogachek
5,765,634 A * 6/1998 Martins ...................... 165/177
5,837,388 A * 11/1998 Doko et al. ................. 428/654
5,875,668 A * 3/1999 Kobayashi et al. ........... 72/181
6,099,974 A 8/2000 Lenling
6,100,496 A 8/2000 Takuya et al.
6,129,147 A * 10/2000 Dumetz et al. ............. 165/177
6,156,134 A * 12/2000 Shimizu et al. ............. 148/526
6,198,068 B1 * 3/2001 Lindstrom ............. 219/121.46
6,319,615 B1 11/2001 Jansen
6,325,141 B1 * 12/2001 Yamauchi et al. .......... 165/177
6,513,728 B1 * 2/2003 Hughes et al. ................ 239/79
6,530,514 B1 * 3/2003 Shabtay ...................... 228/183
2002/0005281 A1 * 1/2002 Krupa et al. ................ 165/177
2002/0127135 A1 * 9/2002 Ohara et al. ................ 420/531

FOREIGN PATENT DOCUMENTS

EP 0 302 232 2/1989
EP 0 982 095 3/2000
WO WO 99/02935 1/1999

* cited by examiner (Continued)

*Primary Examiner*—Lynne R. Edmondson
(74) *Attorney, Agent, or Firm*—Winston & Strawn LLP

(57) ABSTRACT

The invention relates to a method of manufacturing and coating heat transfer parts for a heat exchanger such as tubes in an automobile radiator. The tubes are coated with brazing material by thermal spraying, such as plasma deposition or wire-arc deposition. The coating is then melted by application of heat to braze the tubes to the fins and to the headers to complete the formation of the heat exchanger.

20 Claims, 2 Drawing Sheets

40 23 44 25 42 24 12
26 28
34 30 36 22

THERMAL SPRAY APPLICATION OF BRAZING MATERIAL FOR MANUFACTURE OF HEAT TRANSFER DEVICES

FIELD OF INVENTION

The present invention relates to a method of manufacturing a heat transfer device such as an automobile radiator. The heat exchanger parts to be joined are coated by thermally spraying a braze material, such as by plasma or wire-arc spraying. Following assembly of all parts, the heat exchanger parts are brazed together by heating the braze material to obtain brazed joints and thus form the heat transfer device.

BACKGROUND OF THE INVENTION

Many methods for manufacturing heat exchange tubes exist in the art. Most of the methods involve folding a coated sheet of metal to form channels, applying a flux material to the folded metal, and then heating the folded metal and flux material while applying a brazing material. During the heating process, the flux material cleans the surfaces of the metal so that the brazing material can readily flow into any gaps between the folds to seal the gap and form joints. Generally, the entire sheet of metal is coated with the brazing material and then later with flux or the entire sheet is coated with both the brazing and flux materials. Some metals or metal alloys, such as aluminum, are cladded with a more readily brazable metal or alloy prior to use to facilitate this type of manufacturing process.

Some examples of this technology can be found in the patent literature. European Patent Application No. 0 302 232 discloses a heat exchange tube wherein the terminal edges of the sheet material are rolled towards the center of the material past vertical so that the edges are parallel with the sheet material when they are brazed thereto. U.S. Pat. No. 4,633,056 discloses a method for manufacturing a heat exchange tube having an oval cross-section and a cross web for such tubes. The tube is joined using electron beam welding. U.S. Pat. No. 5,186,251 discloses a heat exchange tube with double row flow passages. U.S. Pat. No. 5,441,106 discloses a heat exchange tube that includes a plurality of internal fins that extend along the length of the tube. The tube is formed of cladded aluminum billet and brazed together. U.S. Pat. No. 5,579,837 discloses a heat exchange tube having a partition formed by two legs having an angle of about 7° to 15° between them. The entire tube is coated with brazing flux prior to brazing. U.S. Pat. No. 5,704,423 discloses a heat exchange tube produced by assembling a main portion and a secondary portion of two different pieces of metal, each generally aluminum or an aluminum alloy. U.S. Pat. No. 5,765,634 discloses a heat exchange tube divided in two by a reinforcing partition. The partition consists of a pleat extending into the interior of the tube and formed in the sheet metal strip from which the tube is fabricated. Prior to joining the ends of the metal strip, one face of the strip is coated with braze metal. As can be seen from the foregoing, no one shape is universally accepted for radiator tube manufacture. These references would generally use a flux or paste containing flux to braze together the metal, especially when using aluminum.

The flux material is generally corrosive to the tube material and the furnace used in the brazing process. This use of flux adds expense to the process. It is often desirable to manufacture a heat exchange tube without the application of a flux. One such fluxless copper alloy used as a brazing filler material is described in U.S. Pat. No. 5,378,294. It may be useful to use such an alloy as a brazing filler material in the manufacture of heat exchanger tubing.

Another method of forming heat transfer tubes is described in the inventor's prior U.S. Pat. No. 6,530,514. This patent describes and claims fluxless brazing techniques generally and brazing with paste and foil specifically.

Fluxless brazing materials can be applied to metal surfaces by a variety of coating techniques. Specifically, one method of depositing brazing material includes a paint-like slurry made by mixing brazing powder with binders and solvents that are used as carriers. After the deposition, the carriers are evaporated by heat and forced air leaving a powder adhered to the surface by the binder. Foil may also be inserted between the materials to be brazed, although the foil may not stick to the surface of flat tubes. The drying step increases the time necessary for this technique and reduces the production rate in such processes.

When using the paint-like slurry the density of the coating using powder is lower than a solid layer since the powder is typically spherical in shape and air may become entrapped between the spheres. The thickness of the coating must often be increased in order to increase the amount of braze material on the coated surface. Increased thickness is not a viable option when a close fit is required in assembly of some parts. The thickness may also cause an increase in part size which may not be desirable in some applications.

Despite these known coating techniques and the prior knowledge of manufacture of heat transfer devices, there still is a need for improved heat exchanger device formation processes, and the present invention discloses a preferred process which avoids the disadvantages of the known techniques.

SUMMARY OF THE INVENTION

The invention relates to a method of forming a heat exchanger that includes the steps of forming configurations from a sheet of a metal or metal alloy that can be joined by brazing, thermally spraying a brazing material upon selected portions of the sheet, wherein the brazing material is capable of bonding to the configurations to form one or more braze joints, and heating the configurations or brazing material to a temperature sufficient to melt the brazing material such that it adheres to the configurations to form one or more braze joints to form the heat exchanger.

The braze material is preferably a metal or alloy chosen to be compatible with the metal or alloy of the sheet. The sheet is typically heated to no more than about 20% above the melting temperature of the brazing material to form the braze joint(s), and the heating typically takes place in a furnace. The braze material may be in the form of a powder or a wire and is applied via a thermal spray gun. The thermal spray includes a plasma or a wire arc.

The configuration is made to form one or more fluid passageways. The configuration is sealed by the braze joint to form one or a plurality of tubes that include the passageways. A plurality of the tubes are joined by one or more headers placed in an operative position to direct or receive fluid from the passageways and form a heat exchanger, such as for use in an automobile radiator. Preferably, the sheet includes copper or a copper alloy and the braze material includes a copper alloy that is formulated to have a lower melting point than that of the sheet.

The invention also relates to a method of forming a tube for a heat exchanger which comprises providing a sheet of a metal or metal alloy that has a base and two ends; folding the ends of the sheet to form legs having sides that oppose one another and sides that oppose the base of the sheet; further folding the ends of the sheet toward one another to form a pair of fluid passageways; applying a brazing material that can adhere to the sheet material without flux between the opposing sides of the legs and between the base and the sides of the legs that oppose the base of the sheet; and applying heat to the sheet and brazing material sufficient to melt the brazing material and have it adhere to the legs and the base to join the legs to one another and to the base of the sheet to form the tube.

The brazing material may be applied by thermal spraying or may be in the form of a paste or foil. The sheet may be formed of copper or copper alloy or a material other than copper or a copper alloy, such as aluminum or aluminum alloy, or stainless steel.

BRIEF DESCRIPTION OF THE DRAWINGS

The invention will be better understood in relation to the attached drawings illustrating preferred embodiments, wherein.

DETAILED DESCRIPTION OF THE INVENTION

Figure 1:
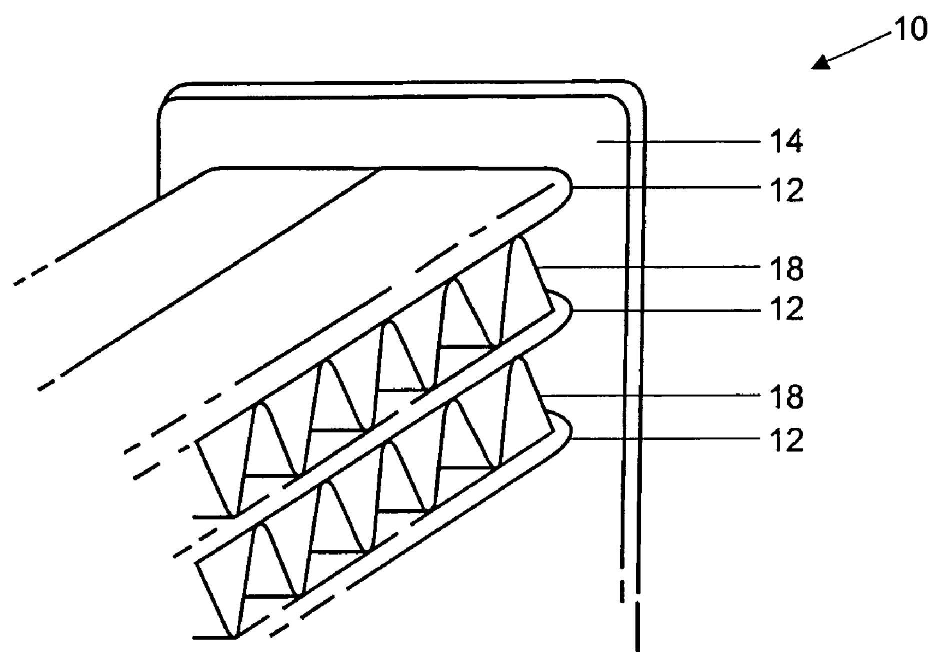
FIG. 1 shows a partial perspective view of an automobile radiator made according to a process of the invention.

Referring to the drawings, FIG. 1 shows a heat exchanger 10 which is designed for use in automotive applications, such as a vehicle radiator. The heat exchanger 10 includes a set of substantially parallel tubes 12 extending between header plates 14. Cooling fluid runs through the tubes 12 between the header plates 14. Fins 18 are attached to the surface of the tubes 12 and run between the tubes 12 to facilitate the conduction of heat away from the tubes 12, and to provide extra surface area for convective heat transfer by air flowing over the heat exchanger 10.

These tubes may be constructed of any suitable brazable material known to those of ordinary skill in the art. Preferably, the tubes are made of copper or a copper alloy, such as copper steel. In one embodiment, the tube metal comprises a CuZn 15 brass that contains about 1% of an additional alloying element to prevent softening of the material during the brazing operation. Typical alloying elements include zinc or nickel. In another embodiment, the tube metal may be made of SM2385, an 85% copper brass, while the headers are made of SM2464, a brass alloy, both commercially available from Outokumpu Copper Strip AB of Västerås, Sweden. The tubes may also be formed of a material that is other than copper or a copper alloy, such as aluminum, aluminum alloys, or stainless steel, or any other material commonly used to form heat transfer tubes.

The tubes of the present invention can be manufactured in a number of ways. One manufacturing technique includes bending the copper or copper alloy sheet as disclosed in U.S. Pat. No. 6,530,514, the contents of which are incorporated herein by reference. However, other bending or forming processes are contemplated by the invention, such as high-frequency tube welding process, and the improvement disclosed herein relates to the placement of braze material by a thermal deposition technique. The thermal deposition brazing could be used on a standard tube shape, as well as the shape described in the '514 patent.

In one embodiment, tube 12 is formed from a sheet that has a base 22 and two ends 23, 25. The ends 23, 25 are folded towards each other until they meet in the center of the sheet. During the fold, the opposing side portions 26, 28 and the top side 24 are formed. The ends 23, 25 are then bent to form the legs 40, 42. This creates an outline of the desired tubular structure, but the ends of the metal sheet are free and not joined.

Figure 2:
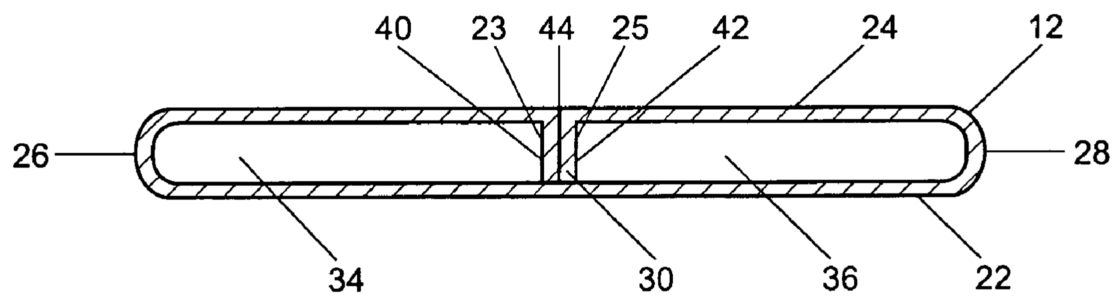
FIG. 2 shows a cross-sectional view of a heat exchanger tube manufactured according to the present invention.

FIG. 2 shows one of the tubes 12 of the heat exchanger 10. The tube 12 includes a base 22, a top side 24, and two generally arcuate, opposing side portions 26, 28. The tube 12 is generally rectangularly shaped and may have round ends, and further includes a partition 30 extending from the base 22 to the top side 24 to define a pair of fluid passageways 34, 36. The partition 30 includes a pair of legs 40, 42 that are bent from the top side 24.

To join the metal ends and form sealed channels, the novel brazing technique described herein is utilized in place of a metal or metal alloy powder, a binder, and a carrier, or a brazing foil. The paste comprises a metal or metal alloy powder, a binder, and a carrier. Generally, the powder is present as the main ingredient, with the binder present in an amount of about 3% to 20% by weight and the carrier being present in an amount of about 1% and 10% by weight. For example, in one embodiment, 100 grams of the powder is mixed with 10 grams of carrier and 2 grams of binder. The paste form of the braze material has the advantage of allowing the material to flow to the desired position on the tube before solidifying.

The carrier is preferably a liquid, such as water or an alcohol, so that the consistency of the paste is not too viscous to facilitate application by painting or brushing. Low molecular weight waxes can also be used. A most preferred carrier is mineral spirits. When the carrier is a liquid and the paste is applied to the parts to be brazed, a drying process is utilized. This is a simple heating process that evaporates most of the carrier, leaving only a small amount on the parts to be brazed, typically less than about 2%, and preferably all of the carrier is evaporated.

When the carrier is wax-based, the binder may be in thermoplastic form. The powder would then be mixed with the wax prior to application. During application of the paste, the thermoplastic binder is heated to 90° C. so that it melts. The paste solidifies upon application to the tube as the heat is transferred to the metal of the tube. No drying process is necessary when using a wax-based carrier, as the wax re-solidifies without such a process.

The powder is a filler that acts to fill the joint between the portions of the tube strip to be joined, while alloying with the tube metal. The filler may include any filler known to those of ordinary skill in the art, such as copper-phosphorus. Preferably, the filler is a copper-nickel-tin-phosphorus alloy, such as OKC600, which is commercially available. OKC600 comprises about 1% to 5% nickel, about 15% to 20% tin, about 4% to 7% phosphorus, and the balance copper. The binder acts as an adhesive to stick the filler to the desired surfaces. It is not necessary to add flux, since phosphorus acts as a flux, making the copper-nickel-tin-phosphorus a self-fluxing alloy resulting in better corrosion properties.

The filler is produced by gas-atomizing to spherical fine grained powder. The maximum particle size is generally about 90 μm, with the average particle size being about 5 μm to 60 μm and preferably about 15 μm to 30 μm.

The brazing paste is typically applied to the tube by spraying with a spray gun. Water or organic solvent-based paste is normally used for radiators with corrugated fins. The thickness of the brazing material is typically measured by weight. Preferably, the brazing material may be applied at about 100 to 300 g/m$^2$, and preferably at about 150 g/m$^2$ to 250 g/m$^2$.

When a brazing foil is used in place of the paste, the foil is inserted between the pieces of the tube to be joined. The foil is very easy to place on the tube where desired. The foil is generally of the same composition that is used for the paste filler, i.e., any copper brazing alloy known to those of ordinary skill in the art. A copper-nickel-tin-phosphorus ally, such as OKC600, is preferred. The foil has a thickness of at least about 0.025 mm and is preferably between about 0.01 and 0.05 mm. Typically, no flux, binder, or carrier is needed for this embodiment. Advantageously, the foil does not require a drying step to volatilize any liquid components. The only step necessary is placing the foil where it is necessary. Binder might be necessary, however, to ensure that the foil stays in position.

In an additional embodiment, a thermal spray process is preferably used for depositing the desired brazing material on the tubes. A plasma or wire-arc is used to apply a braze alloy in powder or wire form. A high temperature area in the nozzle of the thermal sprayer melts the powder or wire which is then impinged on the surface to be brazed at very high velocities. Once it reaches the surface, the brazing material cools and solidifies to create the desired coating. Once the molten particles reach the surface, the spheres flatten while they cool and solidify to create the desired high-density coating. The rate at which the braze alloy is fed to the spray gun can be precisely controlled in order to produce a desired coating thickness.

Figure 3:
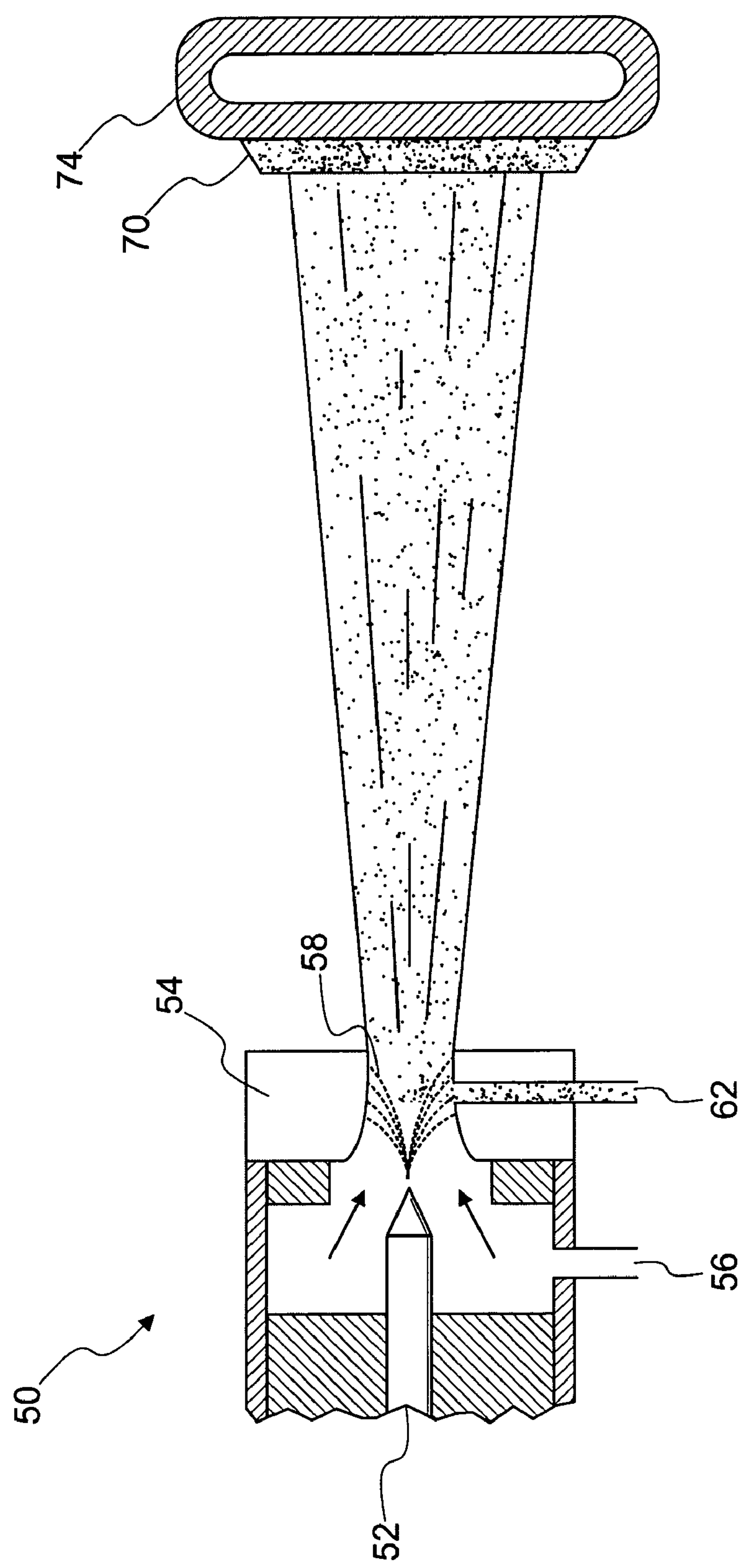
FIG. 3 is a schematic of a plasma spray gun with a powder feed for use with the invention shown coating one side of a high frequency welded tube.

FIG. 3 shows a spray gun with a powder feed. The spray gun 50 includes a cathode 52 and an anode 54. A plasma gas 56 flows in the direction of the arrows around the cathode 52 and through the anode 54. The plasma gas 56 may be formed of argon, nitrogen, hydrogen, or helium. The plasma gas 56 is heated by an arc 58 that forms between the cathode 52 and the anode 54, which causes the plasma gas 56 to reach extreme temperatures, dissociate, and ionize to form a plasma. A powder 62 is fed into the plasma as it exits the nozzle. The powder 62 is rapidly heated and accelerated by the plasma, such that it forms a coating 70 on the substrate 74. The coating 70 then rapidly cools and solidifies on the substrate 74. The substrate 74 will typically be the heat transfer tube. The tube may be of any standard size and shape including the folded shape described in FIGS. 1–2.

Any plasma gun known to those of ordinary skill in the art may be used that is consistent with the desired process. Examples include the Praxair SG-100 commercially available from Praxair of Danbury, Conn. and the PG series plasmagun commercially available from BayState Surface Technologies, Inc. of Auburn, Mass. A wire-arc system that may be useful with the present invention is the Praxair 8835 Arc Spray System.

When producing the flat tubes for constructing heat exchangers, the tubes may be coated on a tube mill at the machine speed of about 600 feet/minute. The headers may also be coated and brazed using this process. When constructing oil coolers, the stamped plates that make the tubes and manifolds can be coated and brazed in this manner. To assemble the heat exchanger, the fins are placed on coated tubes and the tubes are inserted into the coated headers to create the heat exchanger matrix. The brazing furnace then melts the braze alloy and bonds the components together to form the solid heat exchanger unit. The coating is typically performed in an inert atmosphere to insure that the coated braze material will re-melt when brazing the parts together. The thermal spraying technique may also be used for heat exchangers that do not require headers, such as when two opposing sheets are joined to form the tube, which may include one or more channels.

Using thermal spray brazing will typically result in a significant increase in the density of the braze alloy in the coating without increasing its thickness. The molten powder or wire is forced flat by the impact velocity with the surface, instead of spherical as with known techniques. Likewise, with similar coating densities, the thickness may be reduced by using thermal spray coating. The speed of the coating process may be further increased by using two or more guns to coat both side of the tubes simultaneously.

Once the brazing material is applied, the tube is heated to just over the melting point of the filler of the brazing material. The heating permits the tube to become sufficiently coated or wetted by the brazing material. Preferably, the tube is heated to about 20% over the melting point of the filler, more preferably to about 5% over the melting point. This is in contrast to a process where aluminum is brazed. The melting point of the brazing alloy for aluminum is very close to the melting point of the aluminum tube. The brazing alloy is typically a clad layer over the aluminum that is about 10% of the thickness of the tube wall. Thus, when attempting to melt the aluminum brazing alloy, the danger exists that the tube material will also be melted. The melting point for OKC600 braze alloy is typically about 600° C. In one embodiment, the tube is heated to about 630° C. In another embodiment, the tube is heated to about 610° C. These temperatures are much lower than the melting points of the copper alloy tubes that are about 1000° C. to 1100° C. Thus, heating the tube to slightly over 600° C. will melt only the brazing alloy and not the tube.

The legs 40, 42 are first coated with paste or a foil is placed between them. The terminal ends of the legs 40, 42 are also coated with the paste or are placed on top of a foil that is placed upon the base. The paste is generally applied along the braze seam 44 as a bead of paste, while the foil is applied along the same braze seam between the terminal ends of the legs and the base as a strip of foil. The tube is then heated to a temperature above the melting point of the brazing material so as to join the material to form the tube. The two legs 40, 42 are brazed together and the legs 40, 42 are also brazed to the base 22. The tube in cross-section resembles a B shape. It has been found that this shape is especially advantageous in accepting braze material, especially fluxless braze material.

The paste or foil is used to seal the tube and prevent leakage of the cooling fluid that flows through the tube. The paste or foil may be deposited on the surfaces of the sheet before, during, or after the tube is formed. Advantageously, the brazing of the tube does not require flux to be added thereto.

The brazing application generally takes place in a furnace. One concern during the process is to prevent oxidation of the tube or the brazing material. The furnace should have a dew point of less than about −40° C. and an oxygen content of less than about 200 ppm. Often, an inert gas atmosphere, such as nitrogen, is used, with a dew point of about −65° C. and a low oxygen content of about 10 ppm.

EXAMPLE

The surface of a tube to be coated was prepared using fine steel gritblast. The surface may also be pre-heated prior to coating. A plasma gun was used to spray a tube at 750 mm/second for a single pass coating with the nozzle located about 4 to 5 inches from the substrate. The coating on the tube measured about 0.001 inches in thickness per side. The coating took place in an inert atmosphere purged with nitrogen.

It is to be understood that the invention is not to be limited to the exact configuration as illustrated and described herein. Accordingly, all expedient modifications readily attainable by one of ordinary skill in the art from the disclosure set forth herein, or by routine experimentation therefrom, are deemed to be within the spirit and scope of the invention as defined by the appended claims.

What is claimed is:

1. A method of forming a tube for a heat exchanger that comprises:

providing a sheet of a metal or metal alloy that has a base and two ends;

folding the ends of the sheet to form legs having sides that oppose one another and sides that oppose the base of the sheet;

further folding the ends of the sheet toward one another to form a pair of fluid passageways;

thermally spraying with a plasma or wire arc a brazing material that can adhere to the sheet material without flux between the opposing sides of the legs and between the base and the sides of the legs that oppose the base of the sheet; and applying heat to the sheet and brazing material sufficient to melt the brazing material and have it adhere to the legs and the base to join the legs to one another and to the base of the sheet to form the tube.

2. The method of claim 1, wherein the brazing material is in the form of a powder or a wire.

3. The method of claim 1, wherein the brazing material is in the form of a paste comprising a metal or alloy powder filler, a binder, and a carrier.

4. The method of claim 1, wherein the brazing material is in the form of a foil that is placed between the opposing sides of the legs and between the base and the sides of the legs that oppose the base of the sheet.

5. The method of claim 1, wherein the sheet is formed of a material selected from the group consisting of aluminum, aluminum alloys, copper, copper alloys, or stainless steel.

6. The method of claim 1, wherein the sheet is formed of a material other than copper or copper alloys.

7. The method of claim 1, wherein the braze material is a metal or alloy that is compatible with the metal or alloy of the sheet.

8. The method of claim 1, wherein the sheet is heated to no more than about 20% above the melting temperature of the brazing material to form the braze joint(s).

9. The method of claim 2, wherein the brazing material is applied via a thermal spray gun.

10. The method of claim 1, wherein the brazing material is applied in an inert atmosphere.

11. The method of claim 1, wherein the heating is performed in a furnace.

12. The method of claim 1, wherein a plurality of tubes are provided and are further joined to one or more headers placed in an operative position to direct or receive fluid from the fluid passageways to form the heat exchanger.

13. The method of claim 12, wherein a brazing material is applied to the headers by thermal spraying.

14. The method of claim 1, wherein the sheet comprises copper or a copper alloy and the brazing material comprises a copper alloy that is formulated to have a lower melting temperature than that of the sheet.

15. The method of claim 1, wherein the tube is a flat tube.

16. The method of claim 1, wherein the thermal spraying is performed on a tube mill.

17. A method of manufacturing an automobile radiator by providing a heat exchanger having one or more fluid passageways formed according to the method of claim 1.

18. A method of manufacturing an automobile radiator by forming a plurality of heat exchanger tubes according to claim 1 and connecting the tubes in fluid association to form the automobile radiator.

19. A method of manufacturing an automobile radiator by forming a plurality of heat exchanger tubes according to claim 1.

20. In a method for manufacturing a heat exchanger, the improvement which comprises forming one or more fluid passageways in the heat exchanger according to the method of claim 1.

* * * * *